(12) United States Patent
Uchida

(10) Patent No.: US 11,325,734 B2
(45) Date of Patent: May 10, 2022

(54) HEAT SHRINKING APPARATUS IN SHRINK PACKAGING MACHINE

(71) Applicant: OMORI MACHINERY CO., LTD, Saitama (JP)

(72) Inventor: Hiroshi Uchida, Tokyo (JP)

(73) Assignee: OMORI MACHINERY CO., LTD, Saitama (JP)

( * ) Notice: Subject to any disclaimer, the term of this patent is extended or adjusted under 35 U.S.C. 154(b) by 342 days.

(21) Appl. No.: 16/484,898

(22) PCT Filed: Sep. 26, 2018

(86) PCT No.: PCT/JP2018/035657
§ 371 (c)(1),
(2) Date: Aug. 9, 2019

(87) PCT Pub. No.: WO2019/102709
PCT Pub. Date: May 31, 2019

(65) Prior Publication Data
US 2019/0375532 A1    Dec. 12, 2019

(30) Foreign Application Priority Data

Nov. 22, 2017  (JP) .............................. JP2017-224568

(51) Int. Cl.
*B65B 51/10*    (2006.01)
*B65B 53/06*    (2006.01)
(Continued)

(52) U.S. Cl.
CPC .............. *B65B 51/10* (2013.01); *B65B 53/06* (2013.01); *B65B 11/10* (2013.01); *B65B 59/00* (2013.01);
(Continued)

(58) Field of Classification Search
CPC ........ B65B 53/06–53/066; B65B 53/00–53/04
(Continued)

(56) References Cited

U.S. PATENT DOCUMENTS 3,309,835 A * 3/1967 Peppler ................. B65B 53/063
                                                   53/442
3,330,094 A * 7/1967 Ford ..................... B65B 7/2885
                                                   53/329.2
(Continued)

FOREIGN PATENT DOCUMENTS

| JP | H11-180415 A | 7/1999 |
| JP | 2002-211519 A | 7/2002 |
| JP | 2016-078855 A | 5/2016 |

OTHER PUBLICATIONS

International Search Report issued in PCT/JP2018/035657 dated Dec. 4, 2018 (6 pages).
(Continued)

*Primary Examiner* — Hemant Desai
*Assistant Examiner* — Tanzim Imam
(74) *Attorney, Agent, or Firm* — Osha Bergman Watanabe & Burton LLP

(57) ABSTRACT

A heat shrinking apparatus 1 includes: a conveyance unit 11 conveying a package 3 obtained by wrapping an object(s) 5 with a heat-shrink film 4; an endless belt 21 disposed below a conveying surface of the conveyance unit, rotating along a conveying direction of the conveyance unit; and a hot air jet unit 19(20) jetting out hot air from an inside to an outside of a belt surface of the endless belt facing the conveying surface, wherein: the endless belt has a hot air passing portion 30 extending in a belt width direction; the hot air jet unit jets out the hot air toward the conveying surface through the hot air passing portion; and the endless belt rotates following a movement of the package so that a seal
(Continued)

portion(s) 6a(6b) provided at a front end and/or a rear end of the package is/are heat-shrunk with the hot air.

19 Claims, 3 Drawing Sheets

(51) Int. Cl.
*B65B 11/10* (2006.01)
*B65B 59/00* (2006.01)
*B65G 47/84* (2006.01)

(52) U.S. Cl.
CPC ........ *B65B 2220/00* (2013.01); *B65G 47/841* (2013.01)

(58) Field of Classification Search
USPC .................................. 53/557, 442, 556, 441
See application file for complete search history.

(56) References Cited

U.S. PATENT DOCUMENTS

| | | | | |
|---|---|---|---|---|
| RE27,977 E | * | 4/1974 | Monaghan | B65B 11/12 53/442 |
| 5,050,368 A | * | 9/1991 | Noh | B65B 61/02 53/442 |
| 5,062,217 A | * | 11/1991 | Tolson | B65B 53/063 34/443 |
| 5,546,677 A | * | 8/1996 | Tolson | B65B 53/063 34/216 |
| 5,746,041 A | * | 5/1998 | Tolson | B65B 53/06 53/442 |
| 5,786,722 A | | 7/1998 | Buhler et al. | |
| 5,787,682 A | * | 8/1998 | Tolson | B65B 53/063 53/442 |
| 2002/0189204 A1 | * | 12/2002 | Gambetti | B65B 53/02 53/442 |
| 2004/0040265 A1 | * | 3/2004 | Francesco | B65B 53/02 53/557 |
| 2005/0193690 A1 | * | 9/2005 | Schoeneck | B23K 26/0665 53/557 |
| 2005/0198928 A1 | * | 9/2005 | Boriani | B65B 53/02 53/442 |
| 2014/0202117 A1 | * | 7/2014 | Newell | B65B 53/06 53/442 |

OTHER PUBLICATIONS

Written Opinion of the International Searching Authority issued in PCT/JP2018/035657 dated Dec. 4, 2018 (3 pages).

* cited by examiner

[FIG. 1]
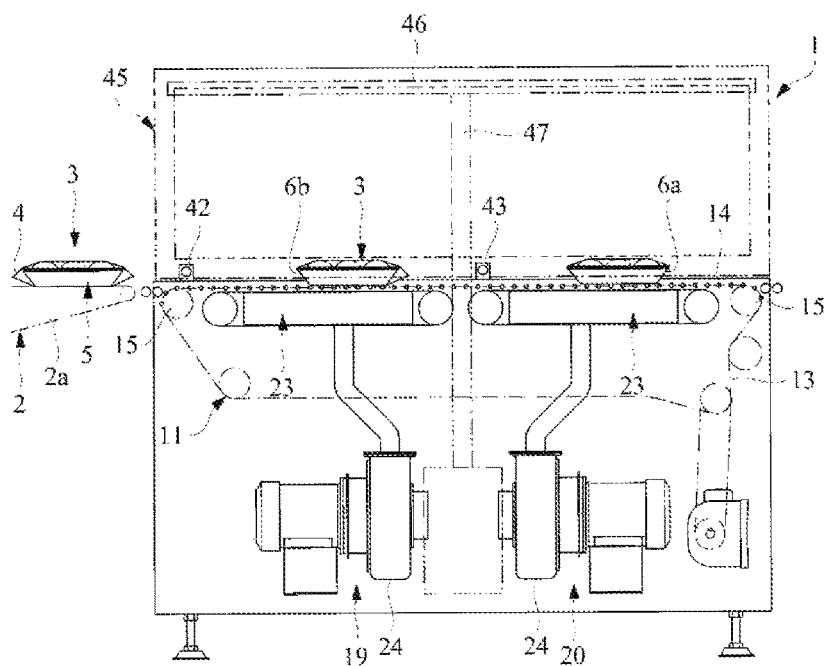
[FIG. 2]
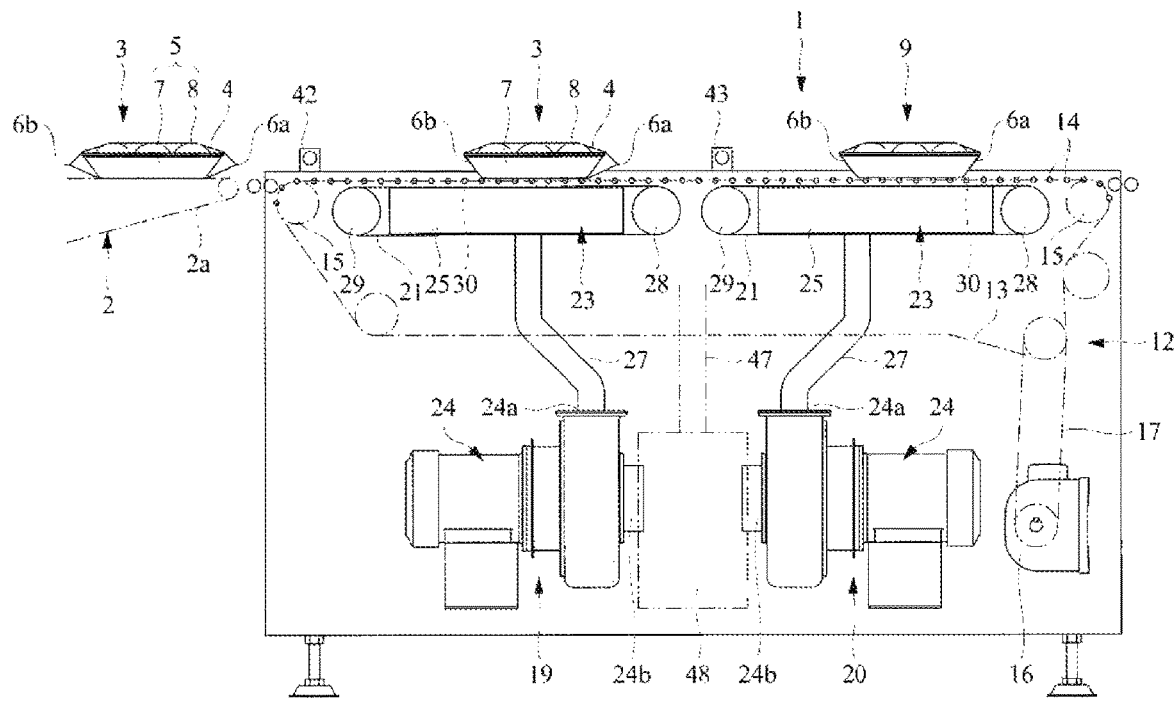

[FIG. 3]
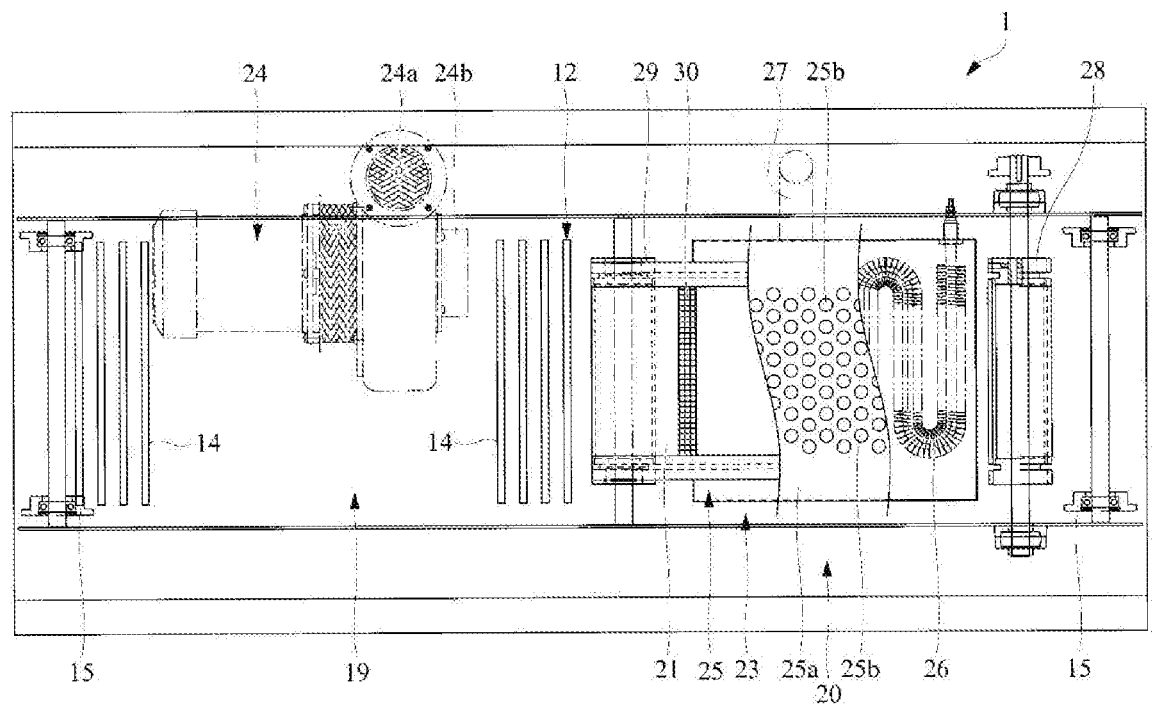
[FIG. 4]
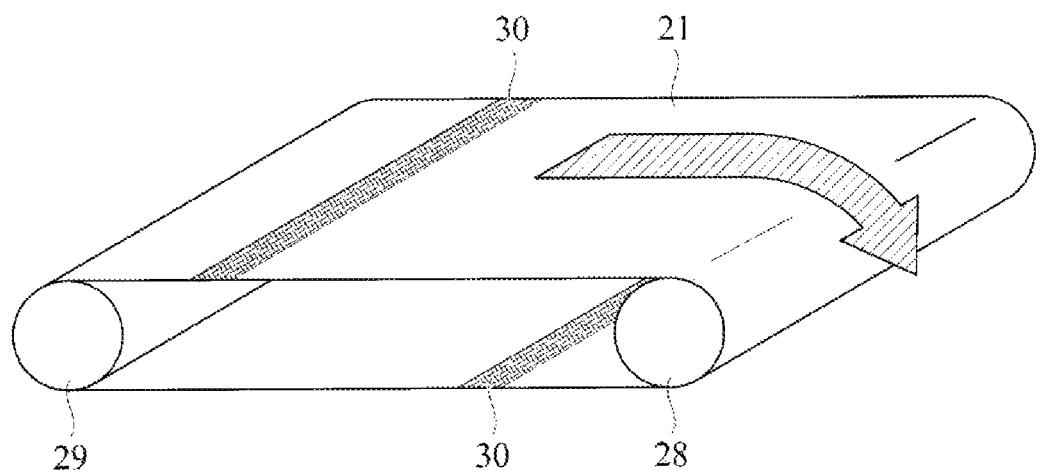

[FIG. 5A]
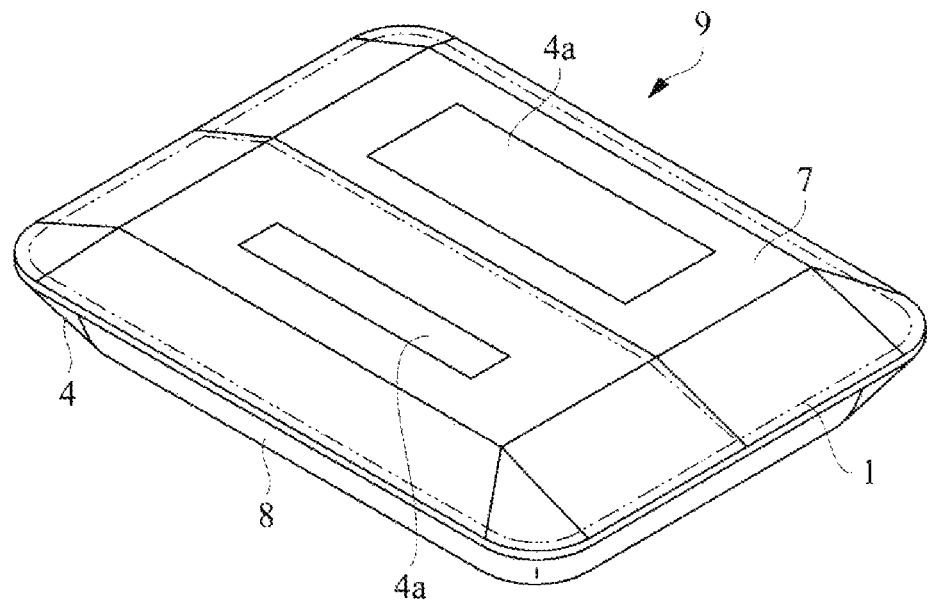
[FIG. 5B]
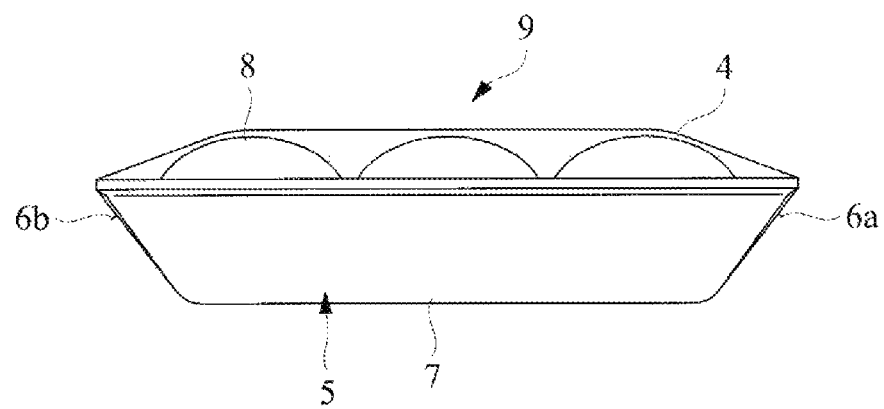

HEAT SHRINKING APPARATUS IN SHRINK PACKAGING MACHINE

TECHNICAL FIELD

The present invention relates to a heat shrinking apparatus in a shrink packaging machine.

BACKGROUND ART

In shrink packaging, a tight shrink package is manufactured in such a manner that a package is prepared by wrapping loosely an object(s) in a plastic film with heat shrinkability (hereinafter referred to as "a shrink film"), and subsequently the shrink film is heat-shrunk by blowing hot air to the shrink film while passing the package through a heat shrinking apparatus. Examples of the object(s) may include one or more product(s) in itself and the product(s) received in a container such as a tray. For example, when a part of the product(s) protrudes above an upper surface of the tray in a state receiving the product(s) in the tray, the shrink film is heat-shrunk and gets in contact with a protruding part to bind the product(s) by shrinkage force of the shrink film and then fix the product(s) in the tray.

There are some shrink films on which printing is performed. When the product(s) is not uniform in size and/or shape such as meats and vegetables, a shrinking amount and a shrinking direction of the shrink film are different in each package. As a result, when the shrink film is heat-shrunk, a position of printing deviates from an intended position, or characters or the like become unreadable due to distortion of printing.

In order to solve the above problem, there is a device disclosed in Patent Literature 1, for example. The device disclosed in Patent Literature 1 has a function of, without blowing the hot air to the package as a whole, heating top seal portions formed at a front side and a rear side in a conveying direction of a pillow package to and heat-shrinking the portions to manufacture a shrink package. Specifically, two nozzles jetting out the hot air are reciprocating-movably provided along the conveying direction of the pillow package. When a sensor on an upstream side detects the top seal portion at the front side of the pillow package, a nozzle on the upstream side follows the pillow package and continues jetting out the hot air toward the top seal portion at the front side. After the nozzle on the upstream side moves by a predetermined distance, it returns to an original position for waiting. When the pillow package is further conveyed and the top seal portion at the rear side is detected by a sensor on a downstream side, a nozzle on the downstream side follows the pillow package and continues jetting out the hot air to the top seal portion on the rear side.

CITATION LIST

Patent Literature

Patent Literature 1: U.S. Pat. No. 5,786,722 (Abstract)

SUMMARY OF INVENTION

Technical Problem

The device disclosed in Patent Literature 1 requires a mechanism for moving the nozzles jetting out hot air reciprocatively along the conveying direction of the pillow package, resulting in that the device is complicated in structure and control. Furthermore, in order to perform a processing on a succeeding pillow package after completed a processing on a preceding pillow package, it is necessary that each nozzle positioned on the downstream side is moved to a waiting position on the upstream side again, resulting in that a high speed processing is prevented.

Solution to Problem

In order to solve the above-mentioned problems, (1) a heat shrinking apparatus in a shrink packaging machine includes: a conveyance unit conveying a package obtained by wrapping an object(s) with a heat-shrink film; an endless belt disposed below a conveying surface of the conveyance unit, rotating along a conveying direction of the conveyance unit; and a hot air jet unit jetting out hot air from an inside to an outside of a belt surface of the endless belt facing the conveying surface, wherein: the endless belt has a hot air passing portion extending in a belt width direction; the hot air jet unit jets out the hot air toward the conveying surface through the hot air passing portion; and the endless belt rotates following a movement of the package so that a seal portion(s) provided at a front end and/or a rear end of the package in the conveying direction is/are heat-shrunk with the hot air jetted out through the hot air passing portion.

In the present invention, the hot air passing portion moves with rotation of the endless belt. Therefore, by rotating the endless belt in accordance with the movement of the package, the hot air passing portion can move while maintaining a state that it faces the seal portion(s) at the front end and/or the rear end of the package. Then, the hot air jetted out through the hot air passing portion can be blown onto the sealing portion(s) for a desired time, and thus the shrink film is heat-shrunk. By preventing the hot air through the hot air passing portion from being directly blown to a bottom surface or the like of the package, it is possible to manufacture a shrink package in which the seal portion(s) as predetermined and a surrounding area thereof are selectively heat-shrunk. Since it is enough to rotate the endless belt in order to displace a position of the hot air passing portion, the heat shrinking apparatus is simple in structure and control. In the embodiment, the hot air passing portion corresponds to a mesh portion 30.

(2) The hot air jet unit may be provided in two places on a front side and a rear side in the conveying direction, one hot air jet unit heat shrinking one seal portion provided at the front end of the package in the conveying direction and the other hot air jet unit heat shrinking the other seal portion provided at the rear end of the package in the conveying direction. In this way, each hot air jet unit can independently jet out the hot air toward the seal portion at the front end or the rear end at an appropriate timing. Therefore, for example, even when the package becomes different in dimension in a front-rear direction, the hot air jet units can heat-shrink the seal portions, respectively, so it is preferable.

(3) The hot air passing portion may be provided in plural places on a front side and a rear side in a rotation direction of the endless belt. In this way, since one hot air passing portion has come to the downstream side and, at that time, the other hot air passing portion has moved to the upstream side, it is possible to jet out the hot air toward the seal portion of a succeeding package immediately. Therefore, a high-speed processing can be achieved.

(4) The heat shrinking apparatus may further include an exhaust recovery system recovering air based on the hot air having jetted out through the hot air passing portion so as to use the recovered air as hot air to be jetted out from the hot air jet unit. In this way, air heated as the hot air jetted out is reused as hot air to be subsequently jetted out from the hot air jet unit. As a result, it is possible to reduce energy consumption when heating with the hot air jet unit or generate hot air of a desired temperature in a shorter time. In the embodiment, the exhaust recovery system is realized by an exhaust recovery hood 46, a pipe 47, an exhaust recovery box 48 and the like.

(5) The hot air jet unit may include a heating box and a blower supplying air to the heating box, the heating box including a housing and a heating unit mounted in the housing; the housing has a number of through holes formed in an upper surface thereof so that the air supplied from the blower is heated by the heating unit and becomes the hot air capable of being jetted out from the through holes; and the endless belt is disposed in such a manner that an inside of the belt surface faces the upper surface of the housing and the through holes are covered with the belt surface so that the hot air is jetted out from the through holes facing at present the hot air passing portion toward the conveying surface through the hot air passing portion. In this way, since the through holes are covered by the belt surface, the hot air cannot be directly blown to the package, in principle. Then, the hot air is jetted out from only the through holes facing the hot air passing portion of the endless belt among the number of through holes and is blown toward the package through the hot air passing portion. With the rotation of the endless belt, the hot air passing portion moves along the upper surface of the heating box toward the downstream side, and the through holes facing the hot air passing portion also are successively shifted toward the downstream side. Therefore, it is enough that the heating box is operated to jet out the hot air from the number of through holes with a simple configuration, so it is preferable.

(6) The heat shrinking apparatus may be arranged downstream of a packaging machine main body manufacturing the package in the shrink packaging machine so that a heat shrinking process is performed on the package delivered from the packaging machine main body. In this way, it is possible to configure the shrink packaging machine in which a series of processing can be automatically performed from manufacturing the package without heat-shrunk to manufacturing the shrink package with heat-shrunk in the seal portion(s).

Advantageous Effects of Invention

According to the present invention, it is possible to provide a heat shrinking apparatus simplified in structure and control by adopting a mechanism of belt rotation.

BRIEF DESCRIPTION OF DRAWINGS

FIG. 1 is a front view showing a heat shrinking apparatus in a shrink packaging machine according to an embodiment of the present invention;

FIG. 2 is an enlarged front view showing a main part of the heat shrinking apparatus;

FIG. 3 is a plan view showing the heat shrinking apparatus omitted partially in illustration;

FIG. 4 is a perspective view showing a belt;

FIG. 5A is a front view showing a shrink package to be manufactured; and

FIG. 5B is a perspective view showing the shrink package to be manufactured as viewed from a bottom surface side.

DESCRIPTION OF EMBODIMENTS

Hereinafter, preferred embodiments of the present invention are described in detail with reference to the drawings.

It should be noted that the present invention is not to be interpreted as being limited to these embodiments, but various changes, modifications and improvements can be made based on knowledge of those skilled in the art without departing from the scope of the present invention.

FIGS. 1 to 4 show a heat shrinking apparatus in a shrink packaging machine according to a preferred embodiment of the present invention. The heat shrinking apparatus 1 according to the present embodiment is disposed on a downstream side of a delivering conveyor 2a of a packaging machine main body 2 of the shrink packaging machine. The packaging machine main body 2 has a function to manufacture and deliver a pillow package 3 (an example of a package). The pillow package 3 is formed by sealing a predetermined position of a shrink film 4 wrapped around an object(s) 5 to be packaged. The pillow package 3 is provided with top seal portions 6a, 6b to be formed by sealing cylindrical end openings in front and rear of a conveying direction. The object(s) 5 in the present embodiment includes a plurality of products 8 accommodated in a tray 7. Examples of the plurality of products 8 include meat products, chicken wings, young chickens and the like in a block shape, and they vary in size. In a state that the plurality of products 8 are stored in the tray 7, a part of the products 8 protrudes above an upper surface of the tray 7.

The heat shrinking apparatus 1 includes a carrying conveyor 11 (an example of a conveyance unit) to which the pillow package 3 is sequentially delivered from the packaging machine main body 2. The carrying conveyor 11 is a kind of a roller conveyor, including a pair of endless chains 13 arranged on both left and right sides in the conveying direction and a number of rollers 14 mounted between the left and right endless chains 13. Each roller 14 is arranged in a direction orthogonal to the conveying direction and is connected to the endless chains 13 in such a manner as to turn on its axis. However, when it is required to adjust positional accuracy while carrying the tray 7, each roller 14 may be connected to the endless chains 13 in such a manner as not to turn on its axis. The endless chains 13 are laid between a plurality of sprockets 15 arranged at a predetermined position. One sprocket 15 is linked to an output of a drive motor 16 via a power transmission chain 17. As a result, when the drive motor 16 rotates, the endless chains 13 rotate in vertical planes, respectively. The rollers 14 revolve following rotation of the endless chains 13 and moves in a horizontal plane at a predetermined upper position. A moving section in this horizontal plane corresponds to a carrying surface. An arrangement pitch of the rollers 14 is made larger than a diameter of the roller 14, and a predetermined space is formed between the rollers 14 disposed in front and rear.

A first hot air jet unit 19 and a second hot air jet unit 20 are disposed below the carrying surface in this order along the conveying direction. The first hot air jet unit 19 and the second hot air jet unit 20 have substantially the same configuration. Specifically, both hot air jet units 19, 20 are provided with an endless belt 21, a heating box 23 disposed in an internal space of the endless belt 21 and a blower 24 of sending air into the heating box 23.

The endless belt 21 is laid between a pair of pulleys 28, 29 arranged in front and rear. The pulley 28 in front along a forwarding direction is linked to a drive motor (not shown). In accordance with a rotational output of the drive motor, the pulley 28 and the endless belt 21 in company therewith rotate. As the drive motor, a speed adjustable motor such as a servo motor may be employed. The servo motor may easily control a change of rotation speed, a pause, a reverse rotation, etc., so that the endless belt 21 changes rotation speed, pauses, or rotates in reverse.

Further, as shown in FIG. 4, the endless belt 21 is provided with a mesh portion 30 (an example of a hot air passing portion) formed in a mesh shape extending in a belt width direction. Inner and outer spaces separated by the endless belt 21 are communicated with each other through a region of the mesh portion 30. The mesh portion 30 is provided on a part of the endless belt 21. When the endless belt 21 rotates in a certain direction, and the mesh portion 30 moves in the same direction. The mesh portion 30 is provided in two at equal pitches. By providing two mesh portions 30 in this way, when one mesh portion 30 comes to a downstream end side, the other mesh portion 30 is positioned on an upstream end side.

The heating box 23 includes a housing 25 formed flat and hollowly and a heater 26 mounted inside the housing 25. The endless belt 21 rotates while being in contact with an upper surface 25a of the housing 25. An air introduction port is provided in a side surface of the housing 25, and a number of through holes 25b are provided in the upper surface 25a of the housing 25. The housing 25 is larger than the endless belt 21 in a width, and both sides of left and right of the housing 25 protrude outward from both sides of the endless belt 21. A region of the through holes 25b is set within the width of the endless belt 21 so that the through holes 25b are not positioned on left and right outside of the endless belt 21. Further, the through holes 25b are provided over the almost entire length in the upper surface 25a along the conveying direction.

An outlet 24a of the blower 24 and the inlet of the heating box 23 are connected by an air blow pipe 27. As a result, when the blower 24 is operated, air sent out from the blower 24 is supplied into the heating box 23 to be heated by the heater 26 and is likely to be discharged upward from the through holes 25b as hot air. In the present embodiment, the endless belt 21 is in contact with the upper surface 25a of the housing 25. As a result, the through holes 25b are mostly covered and blocked with the endless belt 21. Therefore, the hot air is not jetted out through such blocked part. On the other hand, in the region of the mesh portion 30, the hot air is jetted out outward through an overlapping portion of the mesh portion 30 and the through holes 25b. That is, the mesh portion 30 serves as a jetting out position of the hot air. The hot air jetted out through the mesh portion 30 upward and outward reaches over the conveying surface through the spaces between the rollers 14. Further, when the endless belt 21 rotates, the mesh portion 30 also moves forward, and accordingly the jetting out position of the hot air also moves forward.

In the heat shrinking apparatus 1, a pair of first sensors 42 are provided on both left and right sides of the carrying surface of the carrying conveyor 11 on the upstream side of the first hot air jet unit 19, and a pair of second sensors 43 are provided on both left and right sides of the conveying surface of the carrying conveyor 11 on the upstream side of the second hot air jet unit 20. The first sensors 42 and the second sensors 43 are configured in a transmission type sensor, respectively, to output a detection signal upon detection of the pillow package 3 passing in front of each sensor. A control device of the heat shrinking apparatus 1 controls the driving motor for the endless belt 21 based on the detection signals of the first sensor 42 and the second sensor 43. Specific control is described later.

Furthermore, in this embodiment, a tunnel chamber 45 is provided above the carrying conveyor 11. The tunnel chamber 45 has openings on both front and rear surfaces in the conveying direction of the carrying conveyor 11. The openings serve as an entrance and an exit of the pillow package 3. An exhaust recovery hood 46 is provided upward inside the tunnel chamber 45. The exhaust recovery hood 46 has an eave shape opened downward, and warm air due to the hot air discharged from the first hot air jet unit 19 and the second hot air jet unit 20 is recovered by the exhaust recovery hood 46. The exhaust recovery hood 46 is connected to an exhaust recovery box 48 disposed below the carrying conveyor 11 via a pipe 47. The suction port 24b of each blower 24 is connected to the exhaust recovery box 48. As a result, the warm air recovered by the exhaust recovery hood 46 accumulates in the exhaust recovery box 48 passing through the pipe 47. Then, the warm air in the exhaust recovery box 48 is sucked by each blower 24 to be supplied to the first hot air jet unit 19 and the second hot air jet unit 20. As a result, since the warm air is supplied to the first hot air jet unit 19 and the second hot air jet unit 20, each hot air jet unit can discharge the hot air heated efficiently up. To suck the warm air into the exhaust recovery hood 46, for example, an exclusive fan may be disposed in the exhaust recovery hood 46, or a fan of the blower 24 may be utilized without disposing the exclusive fan.

The heat shrinking apparatus 1 of the present embodiment operates as follows. The pillow packages 3 to be sequentially delivered from the packaging machine main body 2 are under situation in which the front and rear top seal portions 6a and 6b are slightly separated from the object(s) 5. The pillow package 3 moves forward on the carrying conveyor 11.

When the pillow package 3 reaches in front of the first sensor 42, the first sensor 42 outputs a detection signal. Upon receiving the detection signal, the control device operates the drive motor for the first hot air jet unit 19 at an appropriate timing. As an example of such appropriate timing, in a case that the endless belt 21 is temporarily stopped under condition of the mesh portion 30 in waiting at a predetermined position on the upstream side as shown in FIG. 4, the control device may control the drive motor to be started when the rear top seal portion 6b reaches above the mesh portion 30 in waiting, and to be rotated in such a manner that the endless belt 21 rotates at the same speed as a carrying speed of the pillow package 3. As a result, the mesh portion 30 follows and moves according to the movement of the pillow package 3, and while moving, the mesh portion 30 holds the position opposed to the rear top seal portion 6b.

Furthermore, the control device also controls the operation of the blower 24 for the first hot air jet unit 19. Specifically, while the mesh portion 30 at least faces the rear top seal portion 6b, the control device may control the blower 24 to send air. As a result, the first hot air jet unit 19 discharges the hot air through the mesh portion 30 in moving to continuously blows the hot air to the rear top seal portion 6b of the pillow package 3 in moving and its surrounding film portion. By being heated for a certain period of time, the rear top seal portion 6b and its surrounding film portion are heat-shrunk, and the rear top seal portion 6b and the like are brought into tight contact with the object(s) 5 as shown in FIGS. 5A and 5B. Regardless of the drive of the blower 24, the heater 26 is constantly energized for heating to constantly heat air in the housing 25.

The pillow package 3 with the rear top seal portion 6b heat-shrunk moves on the carrying conveyor 11 and proceeds to a latter half region. When the pillow package 3 reaches in front of the second sensor 43, the second sensor 43 outputs a detection signal. Upon receiving the detection signal, the control device operates the drive motor for the second hot air jet unit 20 at an appropriate timing. As an example of such appropriate timing, in a case that the endless belt 21 is temporarily stopped under condition of the mesh portion 30 in waiting at a predetermined position on the upstream side as shown in FIG. 4, the control device may control the drive meter to be started when the front top seal portion 6a reaches above the mesh portion 30 in waiting, and to be rotated in such a manner that the endless belt 21 rotates at the same speed as a carrying speed of the pillow package 3. As a result, the mesh portion 30 follows and moves according to the movement of the pillow package 3, and while moving, the mesh portion 30 holds the position opposed to the front top seal portion 6a.

Furthermore, the control device also controls the operation of the blower 24 for the second hot air jet unit 20. Specifically, while the mesh portion 30 at least faces the front top seal portion 6a, the control device may control the blower 24 to send air. As a result, the second hot air jet unit 20 discharges the hot air through the mesh portion 30 in moving to continuously blow the hot air to the front top seal portion 6a of the pillow package 3 in moving and its surrounding film portion. By being heated for a certain period of time, the front top seal portion 6a and its surrounding film portion are heat-shrunk, and the front top seal portion 6a and the like are brought into tight contact with the object(s) 5 as shown in FIGS. 5A and 5B, and then a shrink package 9 is obtained from the pillow package 3. Regardless of the drive of the blower 24, the heater 26 is constantly energized for heating to constantly heat air in the housing 25.

As described above, the mesh portion 30 through which the hot air is jetted out in accordance with the rotation of the endless belt 21 moves from upstream to downstream, and, at this time, the other mesh portion 30 which does not face the carrying surface moves from downstream to upstream. When the endless belt 21 further rotates, the mesh portion 30 which has moved to upstream reaches a waiting position facing the carrying surface on the upper surface side of the endless belt 21, and temporarily stops there to wait for a coming pillow package 3 to be forwarded. In this manner, since, when one mesh portion 30 moves while jetting out the hot air therethrough to heat shrink the top seal portions, the other mesh portion 30 moves toward the waiting position for the next process, it is possible to heat shrink a coming pillow package 3 by jetting out the hot air even if the coming pillow package 3 is delivered immediately after completion of heat shrinking to one pillow package 3. Therefore, it is possible to perform high-speed processing.

As shown in FIGS. 5A and 5B, in the shrink package 9 formed in this manner, the front and rear top seal portions 6a, 6b including surroundings thereof are selectively heat-shrunk to be close or contact to side surfaces of the tray 7 of the object(s) 5. Since the hot air is jetted out onto the front and rear top seal portions 6a, 6b but not onto a bottom surface and other surfaces of the tray 7, a printing portion 4a applied to the shrink film 4 is kept at a target position regardless of size and shape of the products 8 and it is also prevented that characters and the like cannot be read due to distortion of printing.

Further, by using a motor capable of speed control such as a servo motor as the drive motor 16, it is possible to easily and accurately control the movement of the endless belt 21 with the mesh portion 30 and to let the position of the mesh portion 30 through which the hot air is jetted out follow the movement of the pillow package 3. Furthermore, it is possible to easily control a state of shrinking in such a manner that it is shrunk more by adjusting the time for applying the hot air to the top seal portions by stopping the endless belt or returning it a little. On contrary, it is not necessarily to let the mesh portion 30 face the top seal portions and to jet out the hot air while the pillow package 3 is positioned in the placement area of the endless belt 21. For example, in a case that the time for applying the hot air to the top seal positions may be shorter, a part of the placement area of the endless belt 21 moves while maintaining the state that the mesh portion 30 faces the top seal portions, and when passing the part of the placement area, it may be applicable to increase the rotational speed of the endless belt 21 to let the mesh portion 30 take refuge and to position the belt surface of the endless belt 21 in a portion facing the top seal portions so as to block the through holes 25b. As another means, it may also be applicable to stop the blower 24 and stop the hot air jetting out while maintaining the state that the mesh portion 30 faces the top seal portions. It is relatively preferable to let the mesh portion 30 take refuge because it is possible to block the through holes and more reliably prevent the hot air from being blown to the top seal portions. When letting the mesh portion 30 take refuge, a process of stopping the hot air being jetted out from the heating box 22 may also be performed in addition.

In the above-described embodiment, the first hot air jet unit 19 and the second hot air jet unit 20 are provided, and the heat shrinking process to the rear top seal portion 6b and the heat shrinking process to the front top seal portion 6a are separated. However, not limited to this, a modification may be constituted by using one hot air jet unit including one endless belt. In this case, a plurality of mesh portions may be provided on the endless belt at an interval between the front and rear mesh portions as adjusted to a dimension in a longitudinal direction of the pillow package, and the heat shrinking process is simultaneously applied to the front and rear top seal portions. However, it is relatively preferable to prepare a plurality of hot air jet units as the embodiment, because it is easy to respond to the pillow packages 3 in different size and shape.

In the embodiment and the modification described above, the mesh portion is provided in the endless belt 21 as a jetting out port of the hot air. However, not limited thereto, a through hole, an opening portion or the like may also be provided. In short, it is sufficient if a portion through which the hot air can pass is provided in the belt surface.

In the embodiment and the modification described above, the mesh portion 30 temporarily stops at the waiting position, and when the top seal portion of the pillow package 3 to be processed reaches to the waiting position, the endless belt restarts rotation so that the mesh portion 30 moves at the same speed as the pillow package 3. However, not limited thereto, the control device may control the endless belt to continuously rotate under control of the speed or to lay the waiting position below not facing the carrying surface and move the endless belt at the same speed as the pillow package 3 after the top seal portion and the mesh portion face each other at a predetermined position in accordance with the movement of the pillow package.

In the embodiment and the modification described above, the mesh portion 30 are provided in two. However, the mesh portion 30 may be in any quantity, namely one or three or more. For example, in a case of one piece, when the mesh portion has moved downstream and the heat shrinking process to one pillow package is completed, it is necessary to return the mesh portion to the waiting position upstream again by rotating the endless belt. However, by rotating the endless belt in the same direction and making the rotation speed high, it is possible to return the mesh portion to the waiting position in a short time. However, it is relatively preferable that the mesh portion is provided in two as the embodiment or three or more, because it is possible to position the mesh portions at the waiting position one after another without waiting time or in a shorter time.

In the embodiment and the modification described above, an exhaust recovery mechanism is provided to reuse the warm air based on the hot air for the subsequent hot air. However, not limited thereto, the exhaust recovery mechanism may not be provided.

While the various aspects of the present invention have been described using embodiments and modifications, these embodiments and modifications are not intended to limit the scope of the present invention, it should be noted that they are provided to contribute to understanding of the present invention. The scope of the present invention is not limited to configurations and manufacturing methods explicitly described in the description but also includes combinations of various aspects of the present invention disclosed in the description. Configurations to intend to obtain a patent are specified in the appended claims among the present inventions, but there is a possibility of claiming up in future other configurations as disclosed in the description even if they are not specified in the claims at present.

REFERENCE SIGNS LIST

1 . . . heat shrinking apparatus;
2 . . . packaging machine main body;
3 . . . pillow package;
4 . . . shrink film;
5 . . . object(s);
6a . . . top seal portion;
6b . . . top seal portion;
9 . . . shrink package;
11 . . . carrying conveyor;
19 . . . first hot air jet unit;
20 . . . second hot air jet unit;
21 . . . endless belt;
23 . . . heating box;
24 . . . blower;
25 . . . housing;
25a . . . upper surface;
25b . . . through hole;
26 . . . heater;
27 . . . air blow pipe;
30 . . . mesh portion (hot air passing portion);
42 . . . first sensor;
43 . . . second sensor;
45 . . . tunnel chamber;
46 . . . exhaust recovery hood (exhaust recovery system);
47 . . . pipe (exhaust recovery system); and
48 . . . exhaust recovery box (exhaust recovery system).

The invention claimed is:

1. A heat shrinking apparatus in a shrink packaging machine, comprising:
a conveyance unit conveying a package obtained by wrapping at least one object with a heat-shrink film;
an endless belt disposed below a conveying surface of the conveyance unit, rotating along a conveying direction of the conveyance unit; and
a hot air jet unit jetting out hot air from an inside to an outside of a belt surface of the endless belt facing the conveying surface,
wherein:
the endless belt has a hot air passing portion extending in a belt width direction;
the hot air jet unit jets out the hot air toward the conveying surface through the hot air passing portion; and
the endless belt rotates following a movement of the package so that at least one seal portion provided at a front end and/or a rear end of the package in the conveying direction is/are heat-shrunk with the hot air jetted out through the hot air passing portion.

2. The heat shrinking apparatus according to claim 1, wherein the hot air jet unit is provided in two places on a front side and a rear side in the conveying direction, one hot air jet unit heat shrinking one seal portion provided at the front end of the package in the conveying direction and the other hot air jet unit heat shrinking the other seal portion provided at the rear end of the package in the conveying direction.

3. The heat shrinking apparatus according to claim 1, wherein the hot air passing portion is provided in plural places on a front side and a rear side in a rotation direction of the endless belt.

4. The heat shrinking apparatus according to claim 1, further comprising an exhaust recovery system recovering air based on the hot air having jetted out through the hot air passing portion so as to use the recovered air as hot air to be jetted out from the hot air jet unit.

5. The heat shrinking apparatus according to claim 1, wherein:
the hot air jet unit comprises a heating box and a blower supplying air to the heating box, the heating box comprising a housing and a heating unit mounted in the housing;
the housing has a number of through holes formed in an upper surface thereof so that the air supplied from the blower is heated by the heating unit and becomes the hot air capable of being jetted out from the through holes; and
the endless belt is disposed in such a manner that the inside of the belt surface faces the upper surface of the housing and the through holes are covered with the belt surface so that the hot air is jetted out from the through holes facing at present the hot air passing portion toward the conveying surface through the hot air passing portion.

6. The heat shrinking apparatus according to claim 1, being arranged downstream of a packaging machine main body manufacturing the package in the shrink packaging machine so that a heat shrinking process is performed on the package delivered from the packaging machine main body.

7. The heat shrinking apparatus according to claim 2, further comprising an exhaust recovery system recovering air based on the hot air having jetted out through the hot air passing portion so as to use the recovered air as hot air to be jetted out from the hot air jet unit.

8. The heat shrinking apparatus according to claim 3, further comprising an exhaust recovery system recovering air based on the hot air having jetted out through the hot air passing portion so as to use the recovered air as hot air to be jetted out from the hot air jet unit.

9. The heat shrinking apparatus according to claim 2, wherein:
the hot air jet unit comprises a heating box and a blower supplying air to the heating box, the heating box comprising a housing and a heating unit mounted in the housing;
the housing has a number of through holes formed in an upper surface thereof so that the air supplied from the blower is heated by the heating unit and becomes the hot air capable of being jetted out from the through holes; and the endless belt is disposed in such a manner that the inside of the belt surface faces the upper surface of the housing and the through holes are covered with the belt surface so that the hot air is jetted out from the through holes facing at present the hot air passing portion toward the conveying surface through the hot air passing portion.

10. The heat shrinking apparatus according to claim 3, wherein:

the hot air jet unit comprises a heating box and a blower supplying air to the heating box, the heating box comprising a housing and a heating unit mounted in the housing;

the housing has a number of through holes formed in an upper surface thereof so that the air supplied from the blower is heated by the heating unit and becomes the hot air capable of being jetted out from the through holes; and the endless belt is disposed in such a manner that the inside of the belt surface faces the upper surface of the housing and the through holes are covered with the belt surface so that the hot air is jetted out from the through holes facing at present the hot air passing portion toward the conveying surface through the hot air passing portion.

11. The heat shrinking apparatus according to claim 2, being arranged downstream of a packaging machine main body manufacturing the package in the shrink packaging machine so that a heat shrinking process is performed on the package delivered from the packaging machine main body.

12. The heat shrinking apparatus according to claim 3, being arranged downstream of a packaging machine main body manufacturing the package in the shrink packaging machine so that a heat shrinking process is performed on the package delivered from the packaging machine main body.

13. The heat shrinking apparatus according to claim 2, wherein the hot air passing portion is provided in plural places on a front side and a rear side in a rotation direction of the endless belt.

14. The heat shrinking apparatus according to claim 13, further comprising an exhaust recovery system recovering air based on the hot air having jetted out through the hot air passing portion so as to use the recovered air as hot air to be jetted out from the hot air jet unit.

15. The heat shrinking apparatus according to claim 13, wherein:

the hot air jet unit comprises a heating box and a blower supplying air to the heating box, the heating box comprising a housing and a heating unit mounted in the housing;

the housing has a number of through holes formed in an upper surface thereof so that the air supplied from the blower is heated by the heating unit and becomes the hot air capable of being jetted out from the through holes; and the endless belt is disposed in such a manner that the inside of the belt surface faces the upper surface of the housing and the through holes are covered with the belt surface so that the hot air is jetted out from the through holes facing at present the hot air passing portion toward the conveying surface through the hot air passing portion.

16. The heat shrinking apparatus according to claim 14, wherein:

the hot air jet unit comprises a heating box and a blower supplying air to the heating box, the heating box comprising a housing and a heating unit mounted in the housing;

the housing has a number of through holes formed in an upper surface thereof so that the air supplied from the blower is heated by the heating unit and becomes the hot air capable of being jetted out from the through holes; and the endless belt is disposed in such a manner that the inside of the belt surface faces the upper surface of the housing and the through holes are covered with the belt surface so that the hot air is jetted out from the through holes facing at present the hot air passing portion toward the conveying surface through the hot air passing portion.

17. The heat shrinking apparatus according to claim 13, being arranged downstream of a packaging machine main body manufacturing the package in the shrink packaging machine so that a heat shrinking process is performed on the package delivered from the packaging machine main body.

18. The heat shrinking apparatus according to claim 14, being arranged downstream of a packaging machine main body manufacturing the package in the shrink packaging machine so that a heat shrinking process is performed on the package delivered from the packaging machine main body.

19. The heat shrinking apparatus according to claim 15, being arranged downstream of a packaging machine main body manufacturing the package in the shrink packaging machine so that a heat shrinking process is performed on the package delivered from the packaging machine main body.

\* \* \* \* \*